April 5, 1927.
H. S. JANDUS
AUTOMOBILE BUMPER
Filed June 27, 1925
1,623,412
2 Sheets-Sheet 1
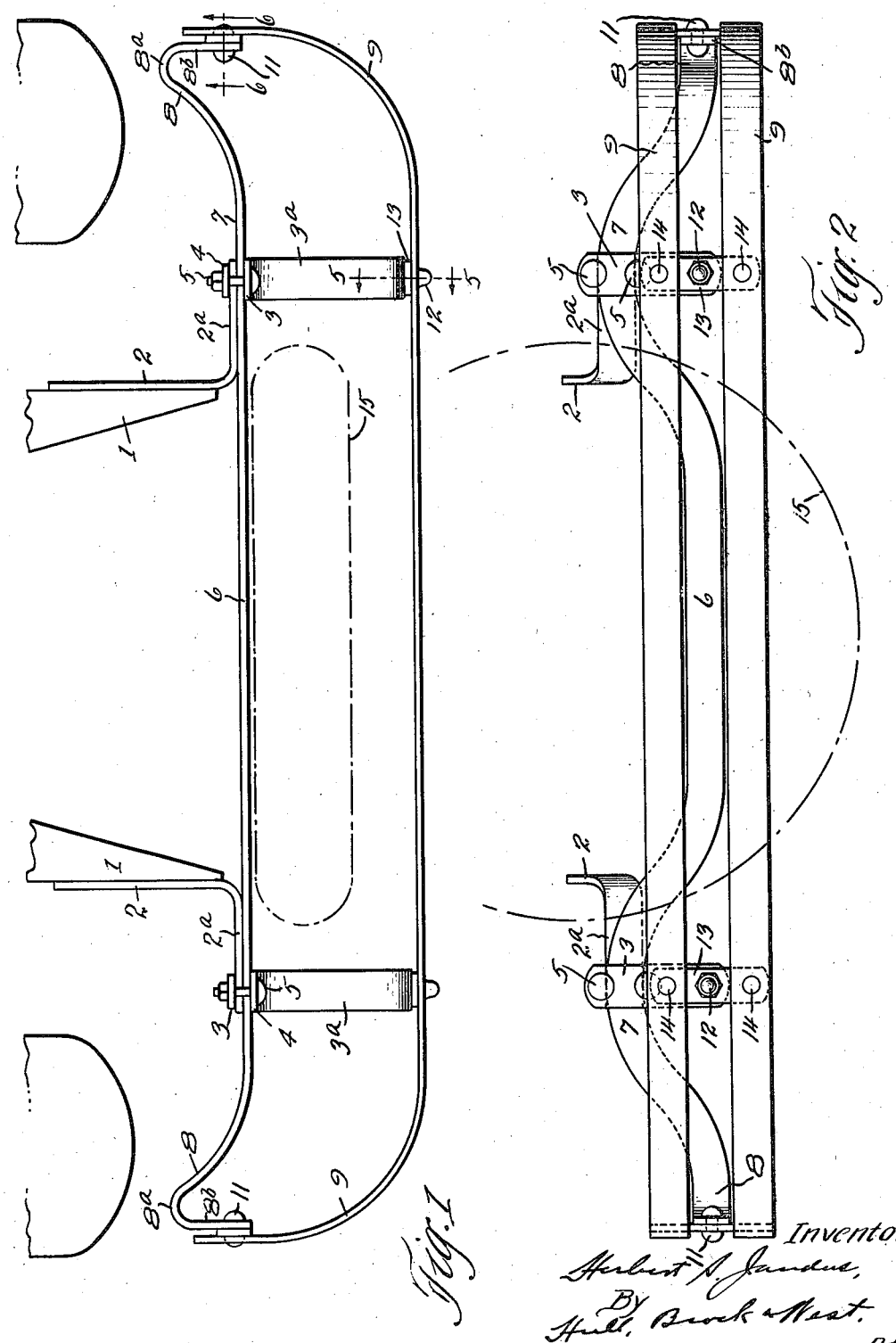

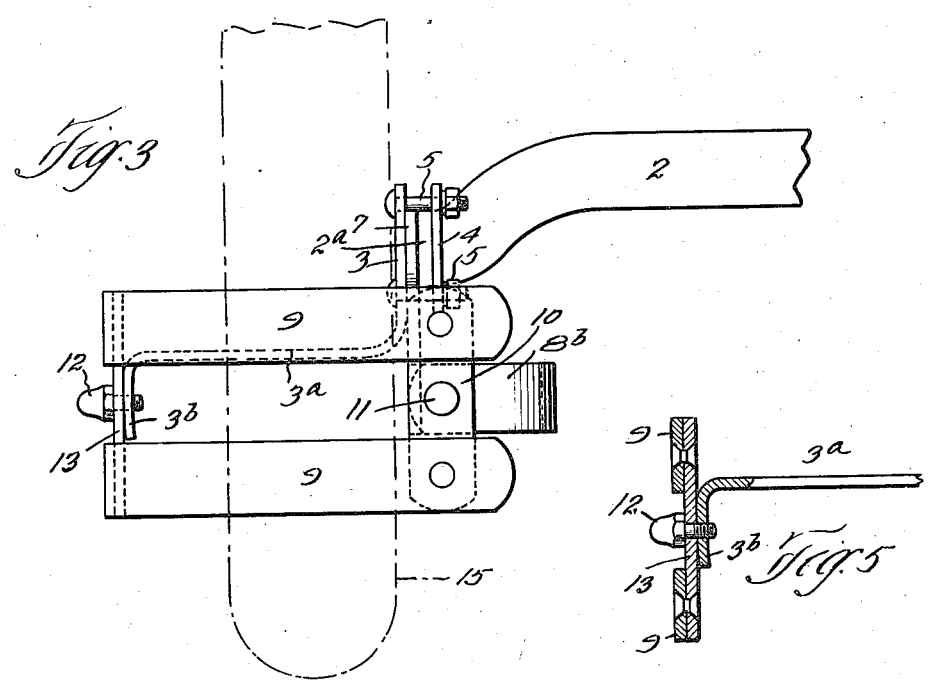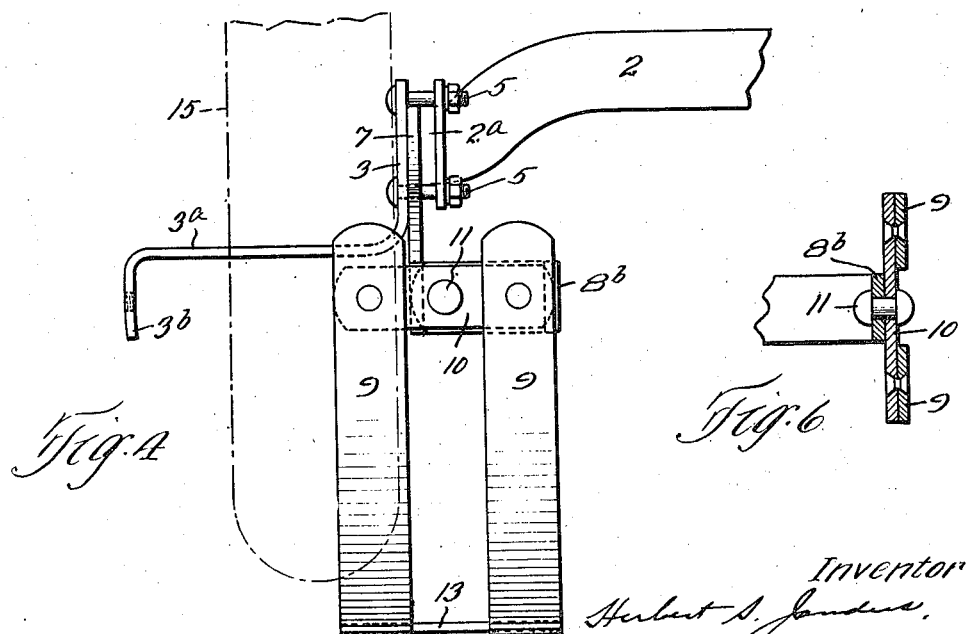

Patented Apr. 5, 1927.

1,623,412

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed June 27, 1925. Serial No. 39,930.

This invention relates to automobile bumpers and more particularly to bumpers of the type which are applied to the rear of automobiles and which are adapted to be swung out of the way to permit convenient access to a spare tire across which the rear of the bumper extends. It is the general purpose and object of the invention to provide a bumper of this character which is comparatively simple of construction and economical of production and which can be conveniently operated to permit access to a spare tire when desirable.

Further and more limited objects of the invention will appear hereinafter and will be realized through the construction and arrangement of parts shown in the drawings wherein Fig. 1 represents a plan view of a bumper embodying my invention, showing the same applied to the rear end of an automobile; Fig. 2, a rear elevation, and Fig. 3 a side elevation, of the said bumper; Fig. 4, a view similar to the elevation in Fig. 3 showing the bumper when in position to permit access to the spare tire; and Figs. 5 and 6 are sectional details corresponding respectively to the lines 5—5 and 6—6 of Fig. 1.

Describing the various parts by reference characters, 1 denotes the rear ends of the side members of an automobile frame and 2 denotes a pair of arms each secured to a member 1 and extending rearwardly therefrom, the ends of said members being bent outwardly at substantially right angles to said members, as shown at 2ª.

Secured to the arms 2, 2ª by clamping bars 3 and 4 and bolts 5 is a front cross bar, the said bar having a horizontal central portion 6 and elevated outer arm portions or members 7 intermediate the central portion and the end portions 8, which end portions are in the line of the horizontal central portion. Each end portion 8 is bent forwardly, as shown at 8ª, and then rearwardly, as shown at 8ᵇ.

9 denotes a pair of rear or impact bars which are connected at their ends in vertically spaced relation by short straps or bars 10, shown as riveted thereto. The middle of each bar or strap 10 is pivoted to the rearwardly extending part 8ᵇ of the front bar by means of a rivet 11.

Each clamping plate 3 projects rearwardly, as shown at 3ª, and then downwardly, as shown at 3ᵇ, forming a bracing and supporting bar the downwardly extending portion 3ᵇ of which is connected by a screw bolt 12 to a short bar or plate 13 which is secured to the bars 9, as by rivets 14.

The space between the front and rear bars is adapted for the reception of one or more tires, as indicated by dot and dash lines at 15.

When it is desired to remove a spare tire from, or insert a tire within, the space between the front and back bars, the screw bolts 12 are removed, permitting the rear bars to drop downwardly about the pivots provided by the rivets 11, it being noted that the forward ends of the bars 9 and the rear end portions 8ᵇ of the rear bar extend in the direction of the side members 1, which allows the bars 9 to swing freely about their pivots when the screw bolts 12 are removed. The shape given to the bar 6—8ᵇ enables the bars 9 to drop clear of the lower central portion of the tire; it also enables the bars 9 to extend across the particular part of the car which it is desired to protect without the use of special elongated supporting arms having their ends in different horizontal planes.

If desired, the central portion 6 of the front member of the bumper may be omitted, employing the arm portions or members 7—8ᵇ to supplement the arms 2, 2ª, the parts 2, 2ª and 7—8ᵇ forming end supporting members for the impact bars 9.

By the construction shown and described, it will be evident that I have produced a bumper which is not only capable of functioning effectively for the protection of the rear end and tire of an automobile but which may be quickly and conveniently operated for the purpose of giving access to the tire and for the purpose of placing the bumper in its operative position thereafter.

Having thus described my invention, what I claim is:—

1. The combination, with the side members of an automobile, of arms secured to the said members and projecting rearwardly therefrom, a bar secured to the said arms and extending across the rear of such vehicle, the said bar having its ends bent rearwardly, one or more impact bars pivotally connected to the ends of the first mentioned bar whereby said impact bar or bars may be swung downwardly and upwardly, and means carried by the first mentioned bar for detachably supporting the impact bar or bars in elevated operative position with respect to the first mentioned bar.

2. The combination, with the frame of an automobile, of one or more impact bars having forwardly directed ends, a pair of supporting members carried by said frame and each having a rearwardly directed portion to which portion the forwardly directed ends of the impact bar or bars are pivoted whereby the said impact bar or bars may be swung downwardly and upwardly, and means for detachably supporting the impact bar or bars in elevated position.

3. The combination, with the frame of an automobile, of arms secured to such frame and each extending rearwardly therefrom, a bumper arm secured to and projecting outwardly from each of the first mentioned arms, each bumper arm having its end extending rearwardly, one or more impact bars each having ends extending forwardly, means pivotally connecting the ends of the impact bar or bars with the ends of the second mentioned arms, whereby the said impact bar or bars may be swung downwardly and upwardly, and means carried by said arms for detachably securing the impact bar or bars in elevated position.

4. The combination, with the frame of an automobile, of arms secured to said frame and having outwardly extending end portions, a bar secured to said arms and having rearwardly extending ends, an impact bar having forwardly extending ends, means pivotally connecting the ends of the impact bar with the ends of the first mentioned bar, a brace bar secured to the first mentioned bar, and means removably securing the said brace bar to the impact bar.

5. The combination, with the frame of an automobile, of a pair of bumper-supporting members secured to said frame and having each a rearwardly extending end, an impact bar having forwardly extending ends, means pivotally connecting the ends of the impact bar with the ends of the said members, a brace bar secured to and projecting rearwardly from each of said members, and means detachably supporting the said impact bar from the said brace bars.

6. The combination, with the frame of an automobile, of supporting members secured to said frame and extending outwardly therefrom and each having a rearwardly directed end, a pair of impact bars spaced rearwardly from the said supporting members and having each forwardly directed ends, means pivotally supporting the ends of the impact bar or bars from the ends of the said members, brace bars secured to said members and projecting rearwardly therefrom, plates connecting the impact bars, and means detachably connecting the said plates to the rear ends of the said brace bars.

7. The combination, with the frame of an automobile, of supporting members secured to said frame and extending outwardly therefrom and each having a rearwardly directed end, one or more impact bars spaced rearwardly from the said supporting members and having each forwardly directed ends, means pivotally connecting the ends of the impact bar or bars with the ends of the said members, rearwardly projecting brace bars, and means detachably securing the said impact bar or bars to the said brace bars.

8. The combination, with the side members of a vehicle and arms connected thereto and extending rearwardly therefrom, of a bar extending across the rear of the vehicle and having elevated portions connected to said arms and a depressed substantially horizontal central portion and end portions in line with such central portion, each end portion having a rearwardly projecting end, a brace bar secured to each of the said arms and to the first mentioned bar and extending rearwardly therefrom and each having a vertical end portion, a pair of impact bars each having forwardly directed ends, plates connecting the ends of the impact bars and plates also connecting intermediate portions of said impact bars, means pivotally connecting the first mentioned plates to the rear ends of the first mentioned bar, and means removably securing the intermediate plates to the vertically directed ends of the brace bars.

9. The combination, with the frame of a vehicle, of a bar extending across the rear of the vehicle and having elevated portions connected to said arms and a depressed substantially horizontal central portion and end portions in line with such central portion, each end portion having a rearwardly projecting end, a pair of brace bars secured to the said bar and extending rearwardly therefrom, an impact bar having forwardly directed ends, means pivotally connecting the ends of the impact bar to the rear ends of the first mentioned bar, and means removably securing the impact bar to the brace bars.

10. The combination, with the frame of an automobile, of a pair of end members supported by said frame and each extending downwardly therefrom and each provided with a rearwardly projecting end, an impact bar having forwardly projected ends pivotally connected with the ends of the said members, whereby said impact bar may be swung downwardly and upwardly about such pivotal connections, a brace bar secured to each of said members and projecting rearwardly therefrom, and means detachably securing the impact bar to said brace bars.

11. The combination, with the frame of an automobile, of a pair of end members supported by said frame and each extending downwardly therefrom and each provided with a forwardly projecting end, an impact bar having forwardly projected ends pivotally connected with the ends of the said members, whereby said impact bar may be swung downwardly and upwardly about such pivotal connections, a brace bar supported from said frame and means detachably securing the impact bar to the said brace bar.

In testimony whereof, I hereunto affix my signature.

HERBERT S. JANDUS.